United States Patent [19]

Nagata et al.

[11] Patent Number: 4,507,348
[45] Date of Patent: Mar. 26, 1985

[54] CORRUGATED BOARD-LIKE SHEET MADE OF SYNTHETIC RESIN

[75] Inventors: Michiaki Nagata, Tokyo; Koji Nakashima, Hiroshima, both of Japan

[73] Assignee: Mitsui Petrochemical Industries, Tokyo, Japan

[21] Appl. No.: 481,016

[22] Filed: Apr. 5, 1983

Related U.S. Application Data

[63] Continuation of Ser. No. 280,074, Jul. 2, 1981, abandoned.

[30] Foreign Application Priority Data

Aug. 29, 1980 [JP] Japan .................................. 55-119572

[51] Int. Cl.³ .............................................. B32B 3/30
[52] U.S. Cl. .................................... 428/172; 108/51.1; 108/901; 156/210; 428/121; 428/182; 428/186; 428/192

[58] Field of Search ............... 428/182, 184, 186, 156, 428/192, 172, 121; 156/205, 208, 210; 108/901, 160, 51.1, 51.3; 248/346

[56] References Cited

U.S. PATENT DOCUMENTS

| 3,677,200 | 7/1972 | Coccagna et al. | 108/901 |
| 4,051,787 | 10/1977 | Nishitani et al. | 108/901 |
| 4,267,223 | 5/1981 | Swartz | 428/186 |

FOREIGN PATENT DOCUMENTS 936051 7/1948 France .................................. 428/182

Primary Examiner—Paul J. Thibodeau
Attorney, Agent, or Firm—Wyatt, Gerber, Shoup, Scobey and Badie

[57] ABSTRACT

This invention relates to a corrugated board-like sheet made of a synthetic resin. More particularly, it relates to a corrugated board-like sheet made of a synthetic resin having a flap portion with hinge effect.

7 Claims, 10 Drawing Figures

4,507,348

CORRUGATED BOARD-LIKE SHEET MADE OF SYNTHETIC RESIN

CROSS RELATED APPLICATIONS

This application is a continuation of application Ser. No. 280,074, filed July 2, 1981, and now abandoned.

BACKGROUND OF THE INVENTION

After the Second World War, so-called corrugated paper boards have been widely spread as packaging materials from the field of paperboard box to the field of wooden caskets. They are also widely used as various cushioning materials. On the other hand, as the progress of mechanization of transportation handling as well as scale-up of machinery, transportation units are growing larger to thereby cause startling changes in transportation circumstances. For example, for conveying cargoes using a fork lift truck, wooden pallet forks have conventionally been used. But, as a part of rationalization in circulation of goods, slip sheets have recently been used in place of these pallets. A slip sheet has a thickness of about 1 to 5 mm, and is made of a sheet of paperboard, fiberboard or synthetic resin sheet, having the same size as the wooden pallet (e.g. 1100×1100 mm), provided with a flap portion with a width of about 60 to 120 mm. This flap, which is simply shaped in a form of a sheet being bent in the direction of handling, may disadvantageously be deformed with ease when gripped by the gripper equipped on the fork lift truck. Also, the sheet material itself constituting a slip sheet is deficient in rigidity, and hence cannot stand sufficiently the load of cargoes and may sometimes be deformed to cause sagging of cargoes, etc. Corrugated paper boards are also used as cushioning materials for cargoes. But also, in this case, when the load is too great, the corrugated portion is completely crushed down to render the corrugated board nothing but a mere flat paper board.

For enhancement of rigidity, there may be employed a corrugated sheet made of a synthetic resin to solve the problem all at once. But, when it is bent to form a flap portion, various troubles may be caused during usage due to lack of flexibility at the bent portion. The bent portion is generally formed by heating the portion to be bent by pressing a heat bar on one side thereof, which is in turn bent by about 15° to 30°. Since fusion occurs only at the liner portion on the heated side, the bent portion after cooling is fixed at the bent angle, showing substantially no flexibility for bending. For this reason, when for example a corrugated sheet of a synthetic resin is used as slip sheet, there may sometimes be caused fracture at the bent portion when the flap portion of a slip sheet having loaded cargoes is drawn by gripping with a gripper to be unnaturally deformed. Such a slip sheet is found, for example, in the Japanese Patent Laid-Open Public Disclosure No. 144564/1977. Similar inconveniences may also occur when there are piled on the floor slip sheets having loaded cargoes and further slip sheets having loaded cargoes are to be placed side by side by means of a fork lift truck. In this case, the flap portions protruded from the cargoes on the side of already placed slip sheets (it is necessary for next conveying to have the flap portions thus exposed) may be contacted with those to be newly arranged, whereby the flaps may be pressed by the cargoes to be broken at the bent portions or increased in the bent angle to be made difficult in handling for the next time. The cargoes may also be broken in such a case. These troubles can be avoided by taking sufficient intervals between arrays of cargoes, but storage efficiency is thereby markedly lowered.

SUMMARY OF THE INVENTION

An object of the present invention is to provide a corrugated board-like sheet made of a synthetic resin (hereinafter referred to merely as corrugated sheet) having a desirable compression strength, comprising a composite having liners on both upper and lower sides and an interlining core which holds space between said liners and is fused to both of said liners, and a flap provided continuous to said composite through an intermediary flute having a certain width, said flute being formed at least at one end thereof by integral fusion of the liners and the interlining core.

Another object of the present invention is to provide a corrugated sheet, wherein said flute portion has a hinge effect.

Still another object of the present invention is to provide a corrugated sheet for use as a slip sheet for conveying of a cargoes or as a cushioning material for packaging having greater compression resistance.

Further, it is also another object of the present invention to provide a corrugated sheet, constituted of a resin material selected from polyethylene, ethylene-propylene copolymer containing not more than 40 mole % of ethylene, and blend of polyethylene and polypropylene with polyethylene content of 50% by weight or less.

Still further object of the present invention is to provide a corrugated sheet for use as a slip sheet, wherein the surface of the upper liner has a non-slip structure.

DESCRIPTION OF THE PREFERRED EMBODIMENT

Figure 1:
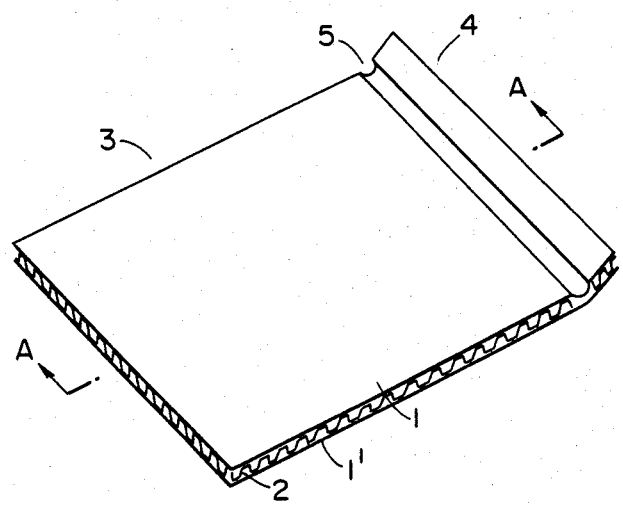
FIG. 1 shows a slant view of one example of a corrugated sheet according to the present invention.
Figure 2:
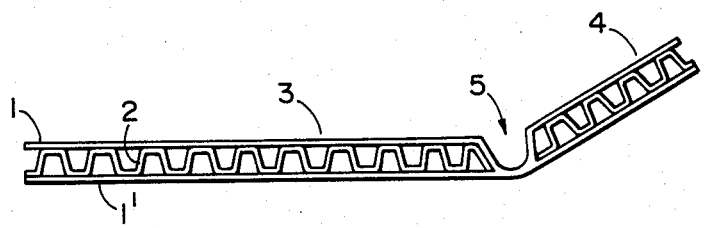
FIG. 2 shows the cross-sectional view taken along the line A—A in FIG. 1.
Figure 3:
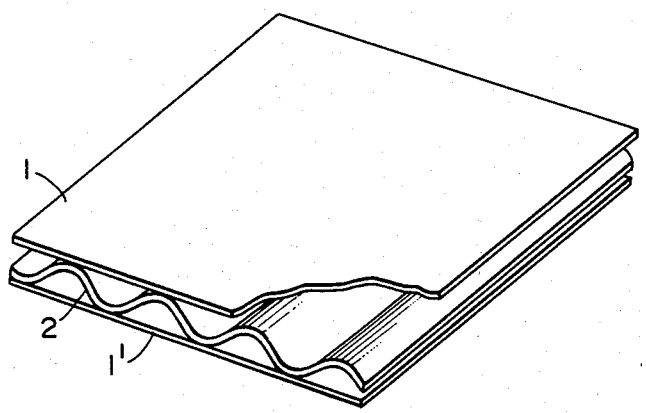
FIGS. 3 through 8 show slant views partially cut of corrugated sheets to be used for preparation of the corrugated sheets according to the present invention, respectively.
Figure 4:
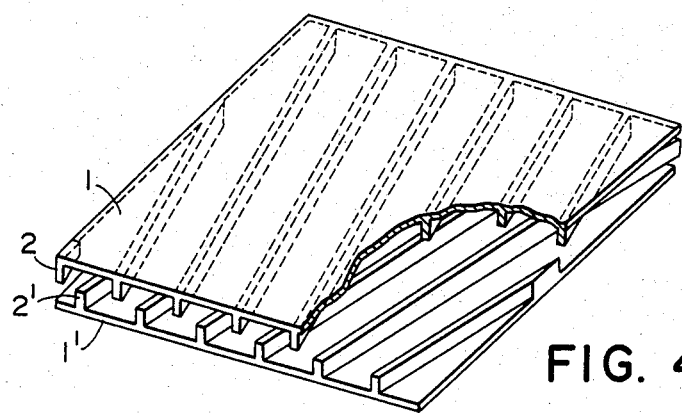
Figure 5:
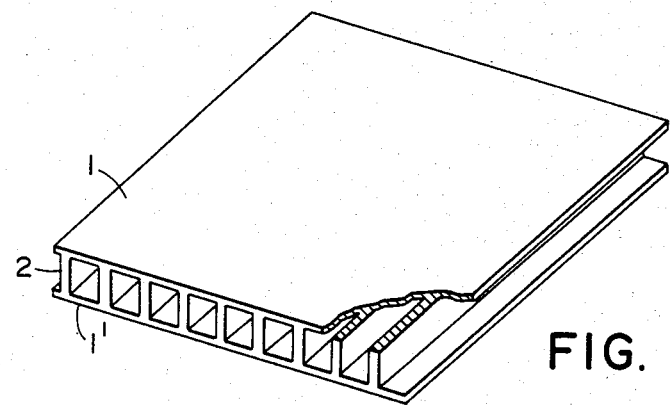
Figure 6:
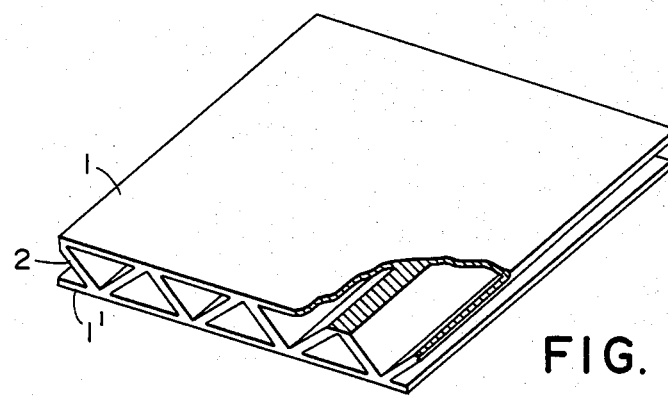

The corrugated sheet according to the present invention, as apparently seen from the examples shown in FIG. 1 and FIG. 2, comprises a corrugated sheet 3 having upper and lower liners 1 and 1' fused on both sides of the interlining core 2 interposed therebetween and has an integrally fused portion 5, wherein the liners 1, 1' and interlining core 2 are heat pressed to be integrally fused into one layer along a continuous line across the corrugated sheet laminate, at a desired position from at least one end of said sheet, and a flap portion 4 capable of being bent through said integrally fused portion 5 connected thereto.

Figure 7:
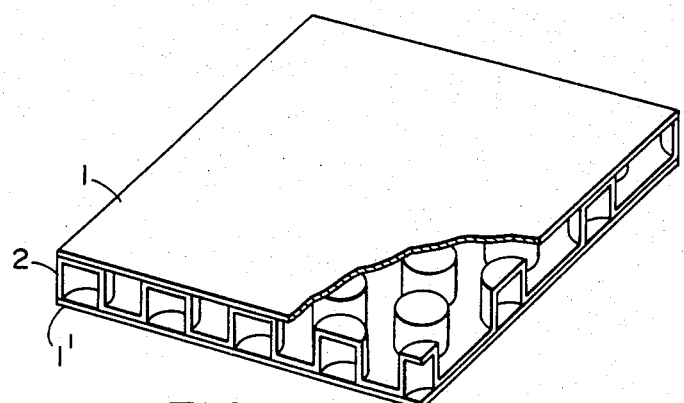
Figure 8:
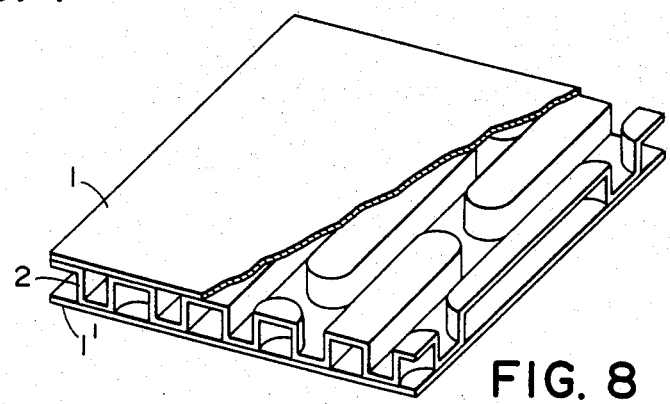
Figure 9:
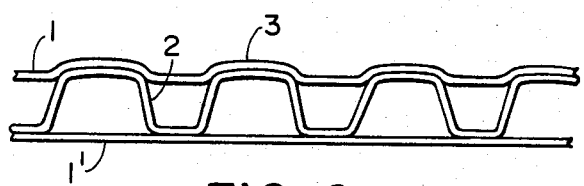
FIG. 9 shows a cross-sectional view of a preferred embodiment in FIG. 7.

The interlining core may have any desired shape and structure, which are not particularly limited. It may be constituted, for example, as illustrated in the slant views partially cut shown in FIGS. 3 through 7 as 2(or 2'). Liners 1, 1' and interlining core 2(or 2') may be molded separately from each other, followed by integral fusion thereof. Alternatively, the whole composite can be molded as one sheet by means of injection molding, etc. Among them, the interlining core having a number of projections as illustrated in FIG. 7 will give a surface of corrugated sheet with slightly swelled portions at the top 3, as shown in FIG. 9, whereby non-slip effect can preferably be imparted to the surface. The height of the swelled parts may be 1 to 40 percent of the total thickness of the sheet, preferably 10 to 15 percent. If the height will be over 40 percent, the stiffness of the sheet may be decreased, while if it will be lower than 0.1%, the above purpose cannot be achieved.

Figure 10:
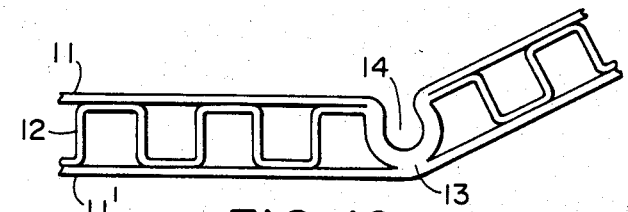
FIG. 10 shows a cross-sectional view of one embodiment of a corrugated sheet according to the present invention.

FIG. 10 shows the cross-sectional view of a corrugated sheet according to the present invention, particularly at the flute 14, which is the connecting part with the flap portion. Thus, the bottom of the flute 14 is constituted of an integrally made portion in which liners 11, 11' and interlining core 12 are pressed together under heating to be provided with properties like one sheet, whereby excellent hinge effect can be obtained For the use of slip-sheet a surface of liner 1(or 11) is preferably of matted finish in view of preventing to slip cargoes off. The matted finish will be 1 to 20 of gloss value according to the method of ASTM D523, preferably 1 to 10. On the contrary, a surface of liner 1'(11') which faces to a floor is of polished finish in view of less friction on the floor. The polished finish will be 30 to 80 of gloss value, preferably 50 to 70.

The liners and the interlining core of these corrugated sheets may each be constituted of a molded product of polyethylene, polypropylene, ethylene-propylene resinous copolymer, polyamide or blends of these with ethylene-propylene rubbery copolymer or ethylene-propylene-diene rubbery copolymer. Among them, molded products of polyethylene, ethylene-propylene copolymer containing not more than 40 mole % of ethylene and blend of polyethylene with propylene containing not more than 50% by weight of polyethylene are particularly preferred. The materials for the liners and for the interlining core may either be the same or different, but it is required that both materials can be fused together by heat pressing. Usually, they are all made of the same material.

Corrugated sheets generally employed have a total thickness of about 3 to 10 mm, preferably about 4 to 6 mm. For example, a corrugated sheet having a thickness of 5 mm will have a unit weight of about 900 g/m$^2$. The liners and the interlining core constituting such a corrugated sheet may have thicknesses such that, when one liner (generally the liner on the floor side of slip sheet) is made to have a thickness of 1, the other liner has a thickness in terms of relative ratio of 1.5 to 2.0 and the interlining core of about 1.5 to 3.0. On said other liner (generally the liner on the loaded side of slip sheet), there may be provided for non-slip purpose a nonwoven fabric, preferably a spun-bonded nonwoven fabric or net, of polypropylene or polyamide having, for example, a unit weight of 10 to 200 g/m$^2$, preferably about 50 to 150 g/m$^2$ to be laminated by heat fusion or with an adhesive, followed by bending working thereof. The interliner core is generally arranged in parallel to the side of the corrugated sheet, but it may also be arranged in a slanted direction by 5° to 60°, preferably 15° to 45°.

The flap to be provided on such a corrugated sheet of the present invention is generally a single flap type, but there may also be employed depending on uses a double flap type, a three flap type or a four flap type, having flaps provided on the adjacent or confronting sides of the sheet. Bending for formation of such a flap portion may be performed by integral fusion of the liners and the interlining core. In case of a double flap type, a three flap type or a four flap type, when the flaps are used for reinforcement of the end portions of packaging material, it is desired to provide a cutting in one of the bending portions 5 of the common flap portion to the crossing point thereof. A width of the bending portion 5 is formed in 0.5 to 4 times of the sheet thickness, preferably 0.8 time to double thereof.

Such an integral fusion may be conducted in preparation of a corrugated sheet, but it is generally performed after preparation of the corrugated sheet to press the sheet with a heat bar equipped with a heater for heating, thereby effecting fusion integrally of liners and interlining core. A heat bar employed may differ depending on the bending angle, which is generally set at about 5° to 60°, preferably about 10° to 30°, and the thickness of the corrugated sheet. But there may generally be used a heat bar rounded at the tip portion, having a thickness of about 3 to 15 mm, preferably about 5 to 8 mm. Fusion may be generally effected at a temperature of about 150° to 250° C., preferably about 160° to 200° C., under a surface pressure of about 0.3 kg/cm$^2$ or more for about 5 to 20 seconds. And, preferably immediately after fusion, bending may be repeated for several times, whereby so called hinge effect can strongly be exhibited to enhance also the strength. As shown in FIG. 10, pressing by means of a heat bar is generally effected only on the side of one liner 11 (the liner on the loaded side of slip sheet) together with interlining core 12, thereby forming a thin laminated portion 13 on the side of the other liner 11' and also a flute portion 14 thereat which enables bending. But it is also possible to effect pressing of the heat bar from both sides of the liners.

In the corrugated sheet having the flap portion connected through a bending portion of integrally fused liners and interlining core, it can be first pointed out that improvement in strength of the bending portion is effected. That is, the load on the bending portion is received by the entire thickness of the integrally made portion. Therefore, the strength can clearly be improved as compared with the case when the load is imposed only on the bending portion formed substantially by the liner on one side, namely only on a part of the thickness of the corrugated sheet. Further, due to appearance of the hinge effect as mentioned above, the breaking strength will not be lowered to a great extent even by performing repeated bendings.

In addition, when the corrugated sheet of the present invention having the flap connected through such a bending portion is used as slip sheet in storage working for piling of cargoes by a fork lift truck, there occurs no accident of breaking by contact of the cargoes with the flap exposed from beneath of the cargoes, since the flap can be bent relatively freely at the bending portion. Moreover, the flap exposed from beneath of the cargoes can be bent vertically along the line of the piled cargoes, and hence the piled cargoes can be placed with no interval to result in the increase of the storage quantity of cargoes to maximum. As an additional advantage, when conveying the slip sheets themselves, they can be piled flat without damaging whole slip sheet including the flap portion and can also, if desired, carry cargoes thereon to increase remarkably transportation efficiency. When the corrugated sheet of the present invention is used as reinforcing material for packaging, the corner portions of cargoes can completely be protected with the flap.

The present invention is to be explained in further detail by referring to the following Examples.

EXAMPLE 1

A corrugated sheet as shown in FIG. 7 was prepared from an ethylene-propylene copolymer (density: 0.9 g/cm$^3$, Melt Index: 1.3 g/10 min., ethylene content: 30 mole %). The liners had thicknesses of 0.2 mm and 0.4 mm, respectively, and the interlining core a thickness of 0.4 mm. As a whole, the corrugated sheet had a thickness of 5 mm, a width of 1400 mm, a length of 1250 mm and a unit weight of 900 g/m$^2$. At 80 mm from the end in the direction of length of this corrugated sheet, there was pressed a heat bar heated to 200° C., with dimensions of 5 mm in thickness and 1500 mm in length having a tip portion rounded at a curvature of radius of 5 mm, under a pressure of 0.3 kg/cm$^2$ for 15 seconds to form a bending portion in which each liner and the interlining core were integrally fused.

For measurement of the strength of the bending portion, there was prepared a test strip having a width of 20 mm and a length of 70 mm, in which the integrally fused portion is located in the center in the direction of length. And, using Instron universal testing machine, the load at break was measured under the conditions of chuck interval of 5 cm and tensile speed of 200 mm/min. to obtain a value of 30.4 kg.

Also for measurement of the hinge characteristic of the bending portion, a test strip of 20 mm in width and 70 mm in length was subjected to the hinge test at a hinge angle of 270°. After bending was repeated 1000 times and 10000 times at the rate of 175 times per minute, the loads at break were measured to be 28.7 kg and 27.6 kg, respectively.

EXAMPLE 2

Similarly as in Example 1, a corrugated sheet was prepared from a high density polyethylene (density: 0.954 g/cm$^3$, Melt Index: 0.90 g/10 min.), and the bending portion was formed according to the same procedures. But, the heat bar was heated to 180° C. and the pressing time was 8 seconds.

The load at break of the bending portion formed was found to be 23.0 kg, and the load at break after the hinge test repeated 1000 times 20.6 kg.

COMPARATIVE EXAMPLE

In Example 1, heat fusion by means of the heat bar is effected only on the liner portion on one side of the corrugated sheet to form a bending at an angle of 30°.

The load at break of the bending portion formed was found to be 24.5 kg and that after the hinge test repeated 1000 times 18.6 kg.

We claim:

1. A corrugated board-like sheet made of a synthetic resin, comprising an interlining core and liners fused on both upper and lower sides of said core, having at least one flap portion provided continuous to said sheet through a bending portion in which the liners and the interlining core are compressed and fused into one continuous layer to provide a hinge effect.

2. A corrugated board-like sheet according to claim 1 having a plurality of flap portions.

3. A corrugated board-like sheet according to claim 1, wherein the top surface of said sheet is a non-slip surface.

4. A corrugated board-like sheet according to claim 3, wherein the non-slip structure is formed by a number of projections on the top surface.

5. A corrugated board-like sheet according to any of claims 1, 2, 3, 4, 6 or 7 wherein the liners and the interlining core are constituted of resin material selected from the group consisting of polyethylene, ethylene-propylene copolymers containing not more than 40 mole % of ethylene, and blends of polyethylene and polypropylene containing not more than 50% by weight of polyethylene.

6. A slip sheet for conveying cargoes comprising a corrugated board-like sheet made of synthetic resin, comprising an interlining core and liners fused to both upper and lower sides of said core, having at least one flap portion provided continuous to said sheet through a bending portion in which the liners and the interlining core are compressed and fused into one continuous layer to provide a hinge effect.

7. A protective material for a packaged product comprising a corrugated board-like sheet made of a synthetic resin, comprising an interlining core and liners fused on both upper and lower sides of said core, having at least one flap portion provided continuous to said sheet through a bending portion in which the liners and interlining core are compressed and fused into one continuous layer to provide a hinge effect.

* * * * *